United States Patent [19]

Schaper et al.

[11] Patent Number: 5,695,342
[45] Date of Patent: Dec. 9, 1997

[54] WORLD MAP SYSTEM

[76] Inventors: Franciscus Ferdinandus Jozef Schaper, Vijverbos 100, NL-2134 GV Hoofddorp; Hubertus Cornelis Joseph Schaper, De Vang 3, NL-1622 GA Hoorn, both of Netherlands

[21] Appl. No.: 637,667
[22] PCT Filed: Nov. 2, 1994
[86] PCT No.: PCT/NL94/00268
  § 371 Date: Jun. 7, 1996
  § 102(e) Date: Jun. 7, 1996
[87] PCT Pub. No.: WO95/12872
  PCT Pub. Date: May 11, 1995

[30] Foreign Application Priority Data

Nov. 2, 1993 [NL] Netherlands ............. 9301886

[51] Int. Cl.⁶ .................. G09B 27/08; G09B 29/02
[52] U.S. Cl. ............................. 434/135; 434/137
[58] Field of Search ..................... 434/131, 135, 434/137

[56] References Cited

U.S. PATENT DOCUMENTS

| | | | |
|---|---|---|---|
| 2,424,601 | 7/1947 | Crouch | 434/135 |
| 2,436,860 | 3/1948 | Fisher | 434/135 |
| 2,967,318 | 6/1961 | Hammer | 434/131 |
| 3,578,331 | 5/1971 | DeGast | 434/131 |
| 4,620,842 | 11/1986 | Wang . | |
| 5,222,896 | 6/1993 | Smith, Jr. | 434/135 |

FOREIGN PATENT DOCUMENTS

| | | | |
|---|---|---|---|
| 1088671 | 3/1955 | France . | |
| 1103710 | 11/1955 | France . | |
| 2 596 182 | 9/1987 | France . | |
| 8001207 | 10/1981 | Netherlands . | |
| 57244 | 4/1996 | Netherlands | 434/135 |
| 2 008 836 | 6/1979 | United Kingdom . | |
| WO 93/03469 | 2/1993 | WIPO . | |

*Primary Examiner*—Paul J. Hirsch
*Attorney, Agent, or Firm*—Young & Thompson

[57] ABSTRACT

A world map system consists of thirty-two loose maps in the form of twelve equilateral pentagons and twenty inequilateral hexagons having alternately a relatively short side and a relatively long side. With these maps a globe can be formed by surrounding each pentagon with five hexagons in such a way that the side of pentagons and hexagons abutting each other are the same length. The ratio of the length of the relatively long hexagon sides to the length of the relatively short hexagon sides lies between 1:0.75 and 1:1.

6 Claims, 2 Drawing Sheets

WORLD MAP SYSTEM

FIELD OF THE INVENTION

The invention relates to a world map system.

BACKGROUND OF THE INVENTION

FR-A-1088671 describes a globe which is made up of twelve equilateral pentagons and twenty inequilateral hexagons having alternately a relatively short side and a relatively long side. Each pentagon is surrounded by five hexagons in such a way that the sides of pentagons and hexagons abutting each other are the same length. The French application describes how the surface areas of the pentagons and hexagons differ very little from each other and touch the same sphere. However, it has been found that giving the pentagons and hexagons essentially the same surface area does not ensure that if they are combined to form a globe, the pentagons and hexagons are at the same or essentially the same distance from the centre of said globe. In other words, contrary to what is claimed in FR-A-1088671, the pentagon and hexagon surfaces do not touch the same sphere. Besides, this reference is not concerned with a set of loose maps which can be laid on a flat surface in a large number of patterns abutting each other, in order to be able to measure the distance between two arbitrary points on earth and to calculate therefrom the actual distance between two arbitrary points on earth and to calculate therefrom the actual distance between points on the earth. If the maps of the globe according to the French application were detached from one another and laid in the above-mentioned manner on a flat surface, the accuracy of the distance calculations would not be satisfactory, because the cartographic scale for the pentagons is not the same as that for the hexagons.

SUMMARY OF THE INVENTION

The object of the invention is to provide a world map system which consists of separate maps and in which the cartographic scale is essentially the same over the entire surface.

To this end, the world map system consists of thirty-two loose maps in the form of twelve equilateral pentagons and twenty inequilateral hexagons having alternately a relatively short side and a relatively long side, which maps together can form a globe through each pentagon being surrounded by five hexagons in such a way that the sides of pentagons and hexagons abutting each other are the same length, the ratio of the length of the relatively long hexagon sides to the length of the relatively short hexagon sides lying between 1:0.75 and 1:10.

A cartographic scale which is totally identical for the pentagons and hexagons is achieved if the abovementioned ratio is 1:0.839.

The latter ratio is approximately 0.69 in the case of the globe according to the abovementioned French patent application.

The ratio of the surface area of a pentagon to the surface area of a hexagon in the system according to the present invention is about 1:1.31, and that according to the French application about 1:1.

The thirty two loose maps can be laid on a table and tacked together in many combinations. The result is cartographically very accurate; the distance between two points can be converted to the actual distance within very narrow limits by way of a scale.

Means can be present to retain the maps in their selected positions relative to each other. For example, the maps are magnetic, and are retained on a steel plate, or the maps are provided at their edges with Velcro strips or magnetic strips, by means of which their positions relative to each other can be temporarily fixed.

Of course, a globe can be formed from the world map system with thirty-two loose maps by joining the maps together. This can also be temporary, depending on the connections at the edges.

The world map system according to the invention could also be used professionally by pilots and ships' navigating officers.

BRIEF DESCRIPTION OF THE DRAWINGS

The invention will now be explained in greater detail with reference to the figures.

Figure 1:
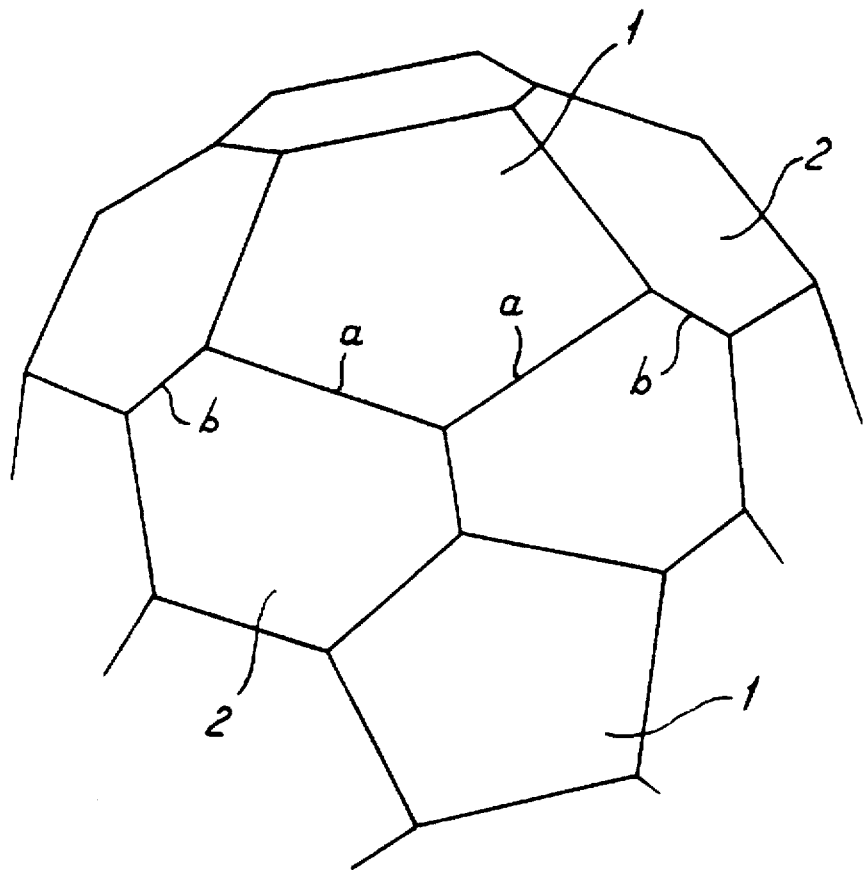
FIG. 1 shows a perspective view of a part of an imaginary globe made up from a world map system according to the invention.
Figure 2:
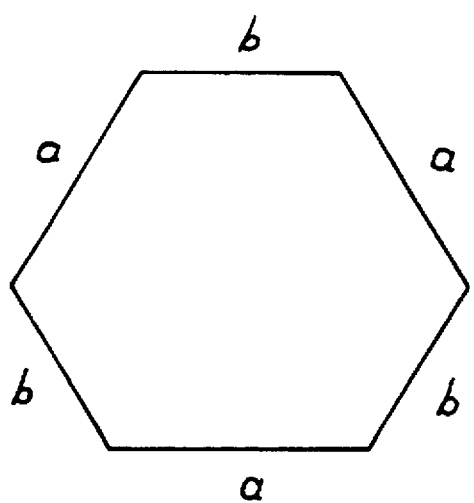
FIG. 2 and 3 show a view of a hexagonal and a pentagonal map respectively use din a world map system according to the invention.
Figure 3:
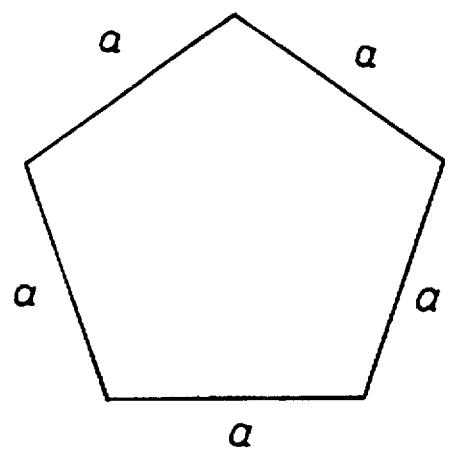

The globe according to FIG. 1 is made up of twelve equilateral pentagonal maps 1 and twenty inequilateral hexagonal maps 2. Each pentagonal map abuts five hexagonal maps, and each hexagonal map abuts three other hexagonal maps and three pentagonal maps. The hexagons are equiangular, but not equilateral. The ratio between the length of the long hexagon sides a and the length of the short hexagon sides b lies in the range 0.75 to 1.0, and is preferably 0.839. This ensures that the maps lie at the same distance from the centre of the globe. The geography of the earth's surface is projected—to scale—gnomonically, in other words, from the center of the globe onto the thirty-two maps.

A number of maps which are placed abutting each other on a flat surface without interruption form a map of a part of the world. Such a map has a number of advantageous and unique characteristics:

1. The actual distance between points shown on the map can be established with great accuracy by measuring the distance on the map with a ruler and multiplying the value obtained by the scale ration.
2. Each country can be compared simply and accurately as regards shape and area with other countries.
3. Each country can act as the center of the word map, which can be laid out in many ways by the user.

Figure 4:
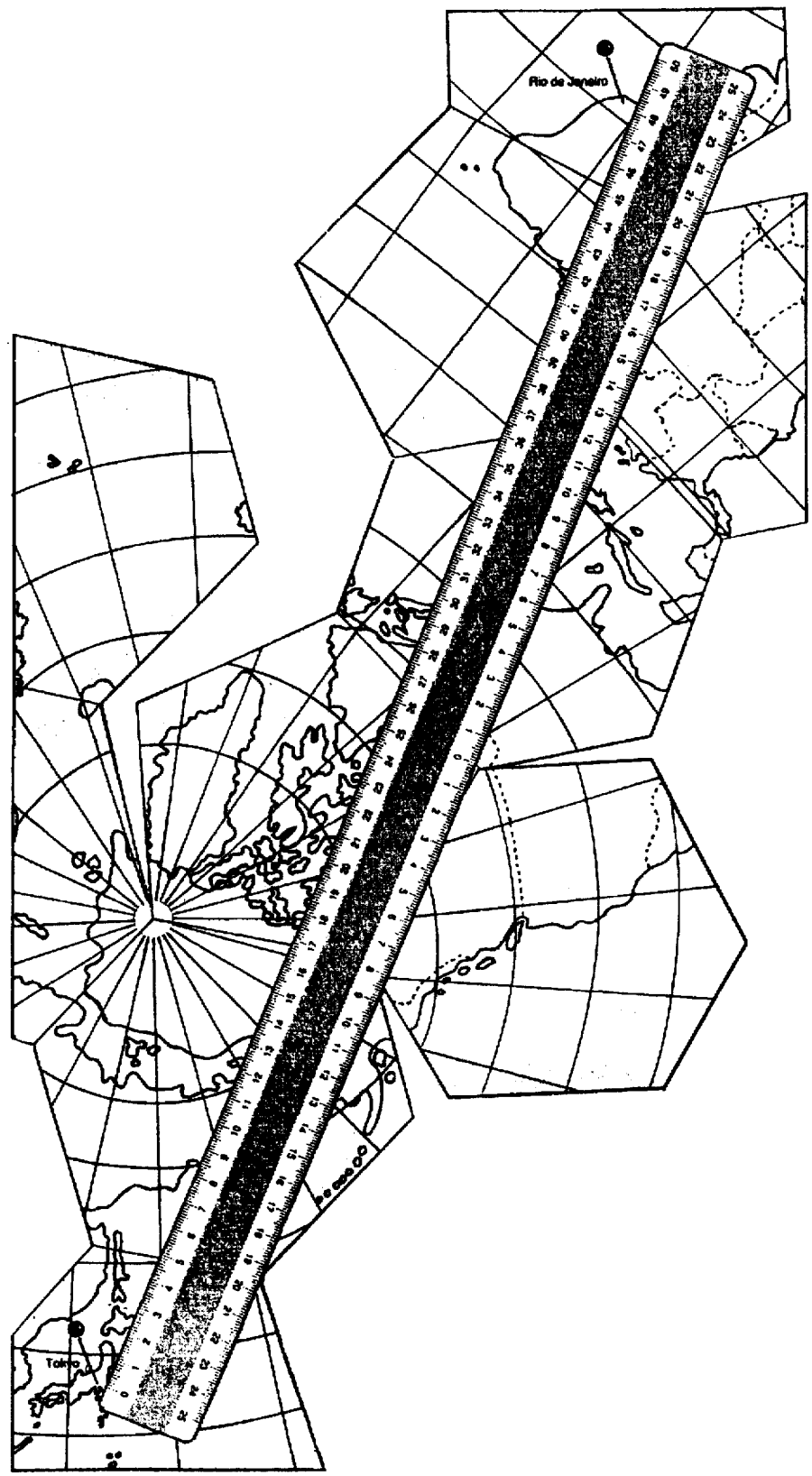
FIG. 4 shows a row of successive maps in which the distance between two points can be established in a simple manner.

FIG. 4 shows a number of maps laid on a flat surface and tacked together, while the distance between Tokyo and Rio de Janeiro is being measured with a ruler. The measured value is multiplied by the scale ratio in order to obtain the correct distance.

It is essential that, as a result of the abovementioned selection of the ratio between the short and long hexagon sides, all thirty-two maps touch one sphere, and that there is no difference in drawing of the projected images on the maps. The distance between two points on the earth can be established accurately by tacking the maps together on a flat surface in such a way that a straight line not interrupted by gaps between maps is produced between these points, and by calculating the actual distance form the measured distance between those points and the scale.

The world map system has educational aspects which constitute a good supplement to an atlas and a globe. For example, the following questions could be answered:

1. How great is the shortest distance between Amsterdam and Honolulu, and over which city would a direct flying route lead: San Francisco, Vancouver or Anchorage?
2. Which city lies furthest form Amsterdam: Singapore or Manila?
3. How great is the distance Santiago, Chile—Hong Kong, and past what important point would a direct flying route lead?
4. Which region is greater: Greenland or Saudi Arabia? For this, a millimeter grid can be place dover both regions and the squares can be counted. An answer to this question is given by comparison of the results.
5. Which fault line is longer: that through the Atlantic Ocean (North-South) or that around the South Pole? Both fault lines can be worked out by tacking the maps together and measuring the distance with a ruler.
6. What is the distance of all other countries from the Netherlands?
7. Which capitals can be reached form Amsterdam by a jumbo jet (flying range 13,000 km) without stopover?
8. Which region is largest and which smallest: Australia, Antarctica or South America?

A certain distortion arises when a flat surface is made from a convex surface. If this distortion is made exactly the same over the entire surface, the distortion will no longer have any adverse effect for establishing distances and surface areas.

We claim:

1. World map system comprising thirty-two loose flat maps in the form of twelve equilateral pentagons and twenty inequilateral hexagons having alternatively a relatively short side and a relatively long side, which maps can be positioned against each other wherein a pentagon is surrounded by at least two hexagons, said maps being loose parts to be laid on a flat surface.

2. World map system according to claim 1, wherein said maps together from a globe in such a way that the sides of the pentagons and hexagons abutting each other are the same length, the ratio of the length of the relatively long hexagon sides to the length of the relatively short hexagon sides lying between 1:0.75 and 1:1.

3. World map system according to claim 2, characterized in that the above mentioned ratio lies between 1:0.80 and 1:0.88.

4. World map system according to claim 3, characterized in that the above mentioned ratio is 1:0.839.

5. World map system according to claim 1, characterized by means for keeping the maps in their selected positions relative to each other.

6. Globe formed by connecting together the maps of the system according to claim 2.

\* \* \* \* \*